United States Patent [19]
Gillery et al.

[11] Patent Number: 5,705,278
[45] Date of Patent: Jan. 6, 1998

[54] HEAT PROCESSABLE METALLIC VACUUM COATINGS

[75] Inventors: F. Howard Gillery, Allison Park; Thomas J. Waynar, New Kensington, both of Pa.

[73] Assignee: PPG Industries, Inc., Pittsburgh, Pa.

[21] Appl. No.: 768,791

[22] Filed: Sep. 30, 1991

[51] Int. Cl.$^6$ .................................................. C03C 17/40
[52] U.S. Cl. .................... 428/433; 428/426; 428/432; 428/469; 428/472; 428/697; 428/699; 428/701; 428/702
[58] Field of Search .................... 428/472, 426, 428/432, 433, 434, 698, 701, 702, 469, 697, 699

[56] References Cited

U.S. PATENT DOCUMENTS

| | | | |
|---|---|---|---|
| 3,962,488 | 6/1976 | Gillery | 427/109 |
| 4,252,862 | 2/1981 | Nishida | 428/698 |
| 4,534,841 | 8/1985 | Martig et al. | 428/426 |
| 4,591,418 | 5/1986 | Snyder | 428/698 |
| 4,847,157 | 7/1989 | Goodman et al. | 428/457 |
| 4,900,630 | 2/1990 | Suzuki et al. | 428/701 |
| 4,990,408 | 2/1991 | Gillery | 428/469 |
| 5,028,759 | 7/1991 | Finley | 219/203 |

FOREIGN PATENT DOCUMENTS

| | | |
|---|---|---|
| 550365 | 9/1956 | Belgium . |
| 0 226 993 | 7/1987 | European Pat. Off. . |
| 0 239 280 | 9/1987 | European Pat. Off. . |
| 0 281 894 | 9/1988 | European Pat. Off. . |
| 0 301 755 | 2/1989 | European Pat. Off. . |
| 60-42253 | 3/1985 | Japan . |
| 0043487 | 2/1990 | Japan . |

OTHER PUBLICATIONS

Chemical Abstracts, vol. 111, No. 2, 10 Jul. 1989, Columbus, Ohio, US; abstract No. 11542q, p. 271; JP 63-242,948.
Chemical Abstracts, vol. 114, No. 18, 6 May 1991, Columbus, Ohio. US; abstract No. 169829k, p. 346; JP 02-233, 534.

Primary Examiner—Archene Turner
Attorney, Agent, or Firm—Donald C. Lepiane

[57] ABSTRACT

A heat processable metallic appearing coated article is prepared by coating a glass substrate with a metal-containing film such as chromium or titanium nitride, which ordinarily oxidizes at high temperature, and overcoating with a protective layer of a different metal which forms a dense oxide surface layer. The coated article is subjected to high temperature processing such as bending without losing its metallic appearance to oxidation.

9 Claims, 1 Drawing Sheet

HEAT PROCESSABLE METALLIC VACUUM COATINGS

BACKGROUND

This invention relates generally to the art of vacuum coating, and more particularly to the art of producing vacuum coatings which maintain a metallic appearance throughout high temperature processes such as bending and laminating.

U.S. Pat. No. 3,962,488 to Gillery discloses a colorless transparent electrically conductive coating made by vacuum depositing a first layer of titanium suboxide, a second layer of silver, and a third layer of titanium suboxide. Deposition of the titanium in a less than completely oxidized state prevents the silver layer from becoming discontinuous. While the titanium suboxide may be slightly colored, it becomes colorless upon oxidation.

U.S. Pat. No. 4,990,408 to Gillery discloses a transparent article for reflecting solar energy comprising a tin/antimony oxide film which exhibits color by interference effects and a reflective metal film preferably comprising chromium, and especially chromium nitride.

Most vacuum coatings on glass which have a desirable metallic appearance as deposited lose their characteristic metallic appearance when subjected to high temperature processing. Vacuum coatings with a metallic appearance are generally metals, metal nitrides or metal carbides which oxidize when heated in air to form metal oxides which are more transparent and less absorbing. While many metals can be heated in air to the forming temperature of glass (600° to 700° C.) developing a protective oxide surface layer, the thinness of transparent metallic coatings and their consequent non-bulk, even porous nature prevent the formation of a suitable protective coating. Thus thin transparent metallic appearing films generally cannot be heated to temperatures at which glass can be bent.

SUMMARY OF THE INVENTION

Vacuum coatings with a metallic appearance as deposited can be made to retain their metallic appearance upon bending by overcoating with a different metal which forms a dense oxide. Further improvement in oxidation resistance of the metallic film can be attained by introducing additional interfaces formed by another layer of a different material, particularly an amorphous metal oxide.

DESCRIPTION OF PREFERRED EMBODIMENTS

In accordance with the present invention, some of the more oxidation resistant coatings, preferably chromium nitride and titanium nitride, which nevertheless normally oxidize quite quickly at 700° C., can be protected from such oxidation by another oxidation resistant metal. The protective layer must be dense to prevent oxidation of the underlying metallic layer. Since metal oxides are generally not sufficiently dense as deposited in vacuum, the protective layer is deposited as a metal which forms a dense oxide surface layer which prevents oxidation of the underlying material. The metal of the protective layer must be different from the metal of the metallic layer in order to prevent oxidation from proceeding through the interface. Thus, for example, a titanium protective layer will prevent oxidation of a chromium nitride layer, whereas a chromium layer will not. Similarly, a titanium protective layer will not protect a titanium nitride layer from oxidation, whereas a silicon protective layer will.

Figure 1:
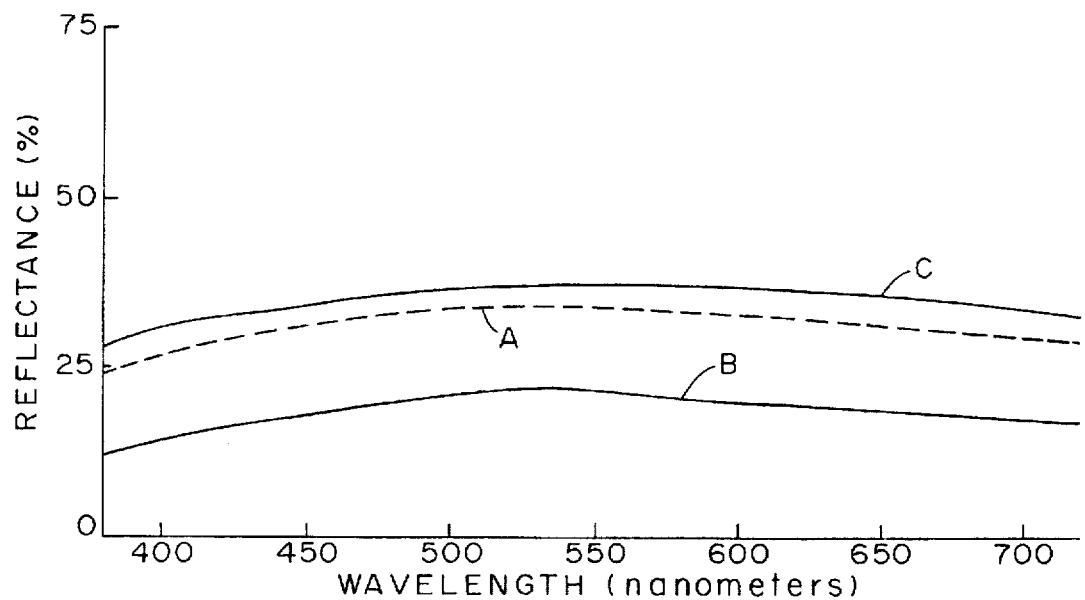
FIG. 1 compares the reflectance of a heated but unoxidized metallic layer in accordance with the present invention (A) with the reflectance of an oxidized metal layer (B) and the reflectance of an unheated metallic layer (C).
Figure 2:
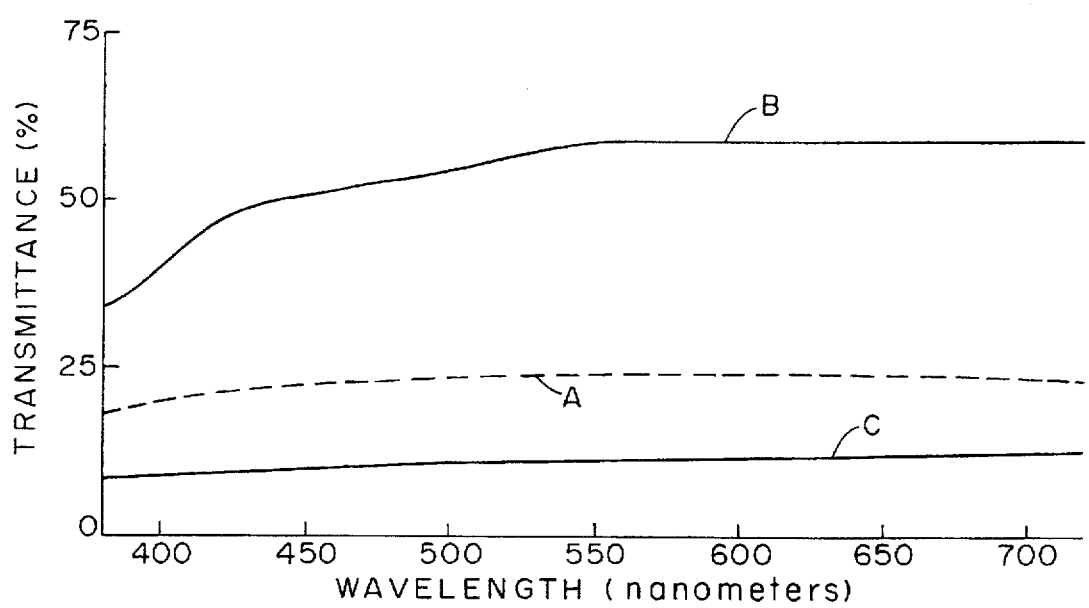
FIG. 2 compares the transmittance of a heated but unoxidized metallic layer in accordance with the present invention (A) with the transmittance of a heated oxidized metallic layer (B) and the transmittance of an unheated metallic layer (C).

An unprotected coating oxidizes upon heating, which results in higher transmittance and lower reflectance than a metallic coating protected in accordance with the present invention, as shown in FIGS. 1 and 2, as well as a hazy and translucent appearance. In contrast, a metallic appearing vacuum coating of e.g. chromium nitride or titanium nitride, protected by a different oxidation resistant layer such as titanium or silicon respectively, in accordance with the present invention, will retain its characteristic metallic reflectance, transmittance and absorbence properties upon heating to glass bending temperatures as shown in FIGS. 1 and 2. The slightly lower reflectance and higher transmittance of the heated coating are the result of oxidation of the surface of the protective layer.

Further improvement in oxidation resistance can be attained by introducing additional interfaces formed by yet another different type of material. This material is preferably glassy, e.g. an amorphous metal oxide, such as zinc-tin oxide, preferably of approximate composition $Zn_2SnO_4$.

In preferred embodiments of the present invention, the coatings are produced on a large-scale magnetron sputtering device capable of coating glass up to 100×144 inches (2.54×3.66 meters). In the following examples, the coatings are deposited on a smaller scale, using planar magnetron cathodes having 5×17 inch (12.7×43.2 centimeter) metal targets of chromium or titanium, or a 3 inch (7.6 centimeter) diameter rotating cathode of silicon. In each example, 6 millimeter thick glass substrates pass the targets on a conveyor roll at a speed of 120 inches (3.05 meters) per minute. The present invention will be further understood from the descriptions of specific examples as follows:

EXAMPLE 1

A coating of chromium nitride about 380 Angstroms thick is made by sputtering a chromium metal target (2 passes) at 7.5 kilowatts, 587 volts in pure nitrogen gas at a pressure of 4 millitorr until the luminous transmission is 9%. The coated glass is then heated for 10 minutes at 570° C. The coating is oxidized by the heat, and its transmittance curve is similar to B in FIG. 2.

EXAMPLE 2

For comparison with Example 1, a coating of chromium nitride about 380 Angstroms thick is made by sputtering a chromium metal target (2 passes) at 7.5 kilowatts, 586 volts in pure nitrogen gas until the luminous transmission is 10%. Then a layer of titanium metal about 40 Angstroms thick is deposited by sputtering a titanium target (one pass) at 0.5 kilowatts, 346 volts, until the transmission of the sample decreases to 8.9%. The sample is heated for 10 minutes at 570° C. and the coating, although its transmittance increases slightly, still has a metallic appearance, and shows spectrophotometric curves similar to (A) in FIGS. 1 and 2. When heated for 10 minutes at 625° C. the coating oxidizes.

EXAMPLE 3

A film of chromium nitride about 380 Angstroms thick applied as in the above examples to 9.6% transmission is overcoated with a layer about 60 Angstroms thick of zinc/tin oxide of approximate composition $Zn_2SnO_4$ made by sputtering a zinc-tin alloy target of Zn-2Sn composition at 1.8 kilowatts, 346 volts in a mixture of 50% oxygen, 50% argon by volume. The transmittance is 10.2%. Finally a layer of titanium metal about 40 Angstroms thick is applied as in Example 2 until the transmittance is 8.7%. The coating remains metallic in appearance after heating for 10 minutes at 570° C. and 10 minutes at 625° C.

EXAMPLE 4

For comparison with Example 3, a coating with the same chromium nitride and titanium layers as in Example 3, but having a layer of titanium oxide about 40 Angstroms thick between the other two layers, is made by sputtering a titanium target at 8 kilowatts, 532 volts, in a 50% argon-oxygen mixture at a pressure of 4 millitorr (2 passes). The transmittance rises from 9.5% to 10.4%. The coating is oxidized after heating for 10 minutes at 625° C.

EXAMPLE 5

A coating with the same chromium nitride and titanium layers as in Example 3, but having a layer of titanium nitride about 40 Angstroms thick between the other two layers, is made by sputtering a titanium target (one pass) at 6 kilowatts, 598 volts, in an atmosphere of pure nitrogen at a pressure of 4 millitorr. The coating is completely oxidized after heating for 10 minutes at 625° C.

EXAMPLE 6

A layer of titanium nitride about 450 Angstroms thick is deposited by sputtering a titanium metal target in pure nitrogen gas at a pressure of 4 millitorr. The voltage is 764 volts and the power 8 kilowatts. After 4 passes the transmittance is 23.5%. The color is bluish metallic. After heating in air for 10 minutes at 570° C., the coating is completely oxidized.

EXAMPLE 7

For comparison with Example 6, a layer of titanium nitride about 500 Angstroms thick is deposited as in Example 6. The transmittance is 20.2%. A layer of silicon about 200 Angstroms thick is deposited by sputtering an Airco Coatings Technology C-Mag rotary cathode having silicon target material at 1 kilowatt, 583 volts (2 passes). The transmittance is 10.8%. After heating for 10 minutes at 625° C., the coating is still bluish and metallic appearing.

EXAMPLE 8

A layer of titanium nitride about 470 Angstroms thick is applied as in Example 6. The transmittance is 22.8%. A layer of silicon nitride about 100 Angstroms thick is applied from a C-Mag cathode as in Example 7, by sputtering a silicon target at 3 kilowatts, 416 volts in pure nitrogen gas at 4 millitorr. The transmittance rises to 25% after a single pass. The appearance of the sample is unchanged after heating for 10 minutes at 625° C.

The above examples are offered only to illustrate the present invention. Other metal, metal nitride and metal carbide metallic appearing films may be protected from oxidation by dense oxide surface forming metal layers as described above. Deposition conditions will vary according to equipment and material being deposited. Coating thicknesses can be varied to produce the desired reflectance and transmittance properties. The scope of the present invention is defined by the following claims.

We claim:

1. A heat processable, metallic appearing coated article comprising:

a transparent glass substrate;

a metallic appearing metal-containing film deposited on a surface thereof;

an amorphous metal oxide layer over the metallic appearing metal containing film; and a protective layer comprising a different metal from the metal-containing film deposited over the amorphous metal oxide layer.

2. A coated article according to claim 1, wherein the metal-containing film is selected from the group consisting of metals, metal nitrides and metal carbides.

3. A coated article according to claim 2, wherein the metal-containing film is selected from the group consisting of chromium nitride and titanium nitride.

4. A coated article according to claim 1, wherein said protective layer is a metal which forms a dense oxide surface.

5. A coated article according to claim 4, wherein said protective layer is selected from the group consisting of chromium, titanium and silicon.

6. A coated article according to claim 1, wherein the metal-containing layer is chromium nitride and the protective layer is titanium.

7. A coated article according to claim 1, wherein the metal-containing layer is titanium nitride and the protective layer is silicon.

8. A coated article according to claim 1, wherein said metal oxide layer comprises zinc and tin.

9. A heat processable, metallic appearing coated article comprising:

a. a transparent glass substrate;

b. a metallic appearing metal-containing film selected from the group consisting of chromium nitride and titanium nitride;

c. a protective layer selected from the group consisting of titanium and silicon, and d. amorphous metal oxide layer deposited between the metal-containing film and the protective layer having the approximate composition $Zn_2SnO_4$.

* * * * *